United States Patent Office 3,274,256
Patented Sept. 20, 1966

3,274,256
SYMMETRICAL AND UNSYMMETRICAL ORGANOPHOSPHORUS COMPOUNDS
Sheldon A. Buckler and Martin Epstein, Stamford, Conn., assignors to American Cyanamid Company, New York, N.Y., a corporation of Maine
No Drawing. Filed Mar. 1, 1962, Ser. No. 176,816
5 Claims. (Cl. 260—606.5)

The present invention relates to secondary phosphine oxides, symmetrical and unsymmetrical. More particularly, the instant discovery concerns secondary phosphine oxides of the formula

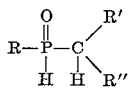

wherein R represents alkyl ($C_1$–$C_{18}$), substituted or unsubstituted, aryl, aralkyl, para-halosubstituted phenyl and cycloalkyl; R' represents alkyl ($C_1$–$C_8$) and phenyl; R" represents alkyl ($C_2$–$C_8$) and phenyl; R' and R" taken together with

represent cyclohexyl; and the sum of the steric substituent constants, $E_s$, of the moieties R— and

is below about −1.50 at 25° C.

These secondary phosphine oxides are prepared by reacting the corresponding primary phosphine of the formula $$R—PH_2$$

with the corresponding carbonyl compound of the formula

in the presence of a concentrated acid, particularly a concentrated mineral acid, such as HCl $H_2SO_4$, HBr, $H_3PO_4$ and the like.

The products of the present invention, as evidenced from the reaction and from the product formula described hereinabove, are oxygen transfer products. When the sum of the steric substituent constants, $E_s$, of the moieties R— and

is −1.50 or higher at 25° C., say −1.30, the reaction contemplated herein is not arrested and a hydroxy-substituted organic tertiary phosphine oxide results. This is the subject of copending U.S. application Serial No. 176,775 filed simultaneously herewith on March 1, 1962.

A typical embodiment according to the present invention is the following in which cyclohexanone is reacted with cyclohexylphosphine in the presence of concentrated hydrochloric acid:

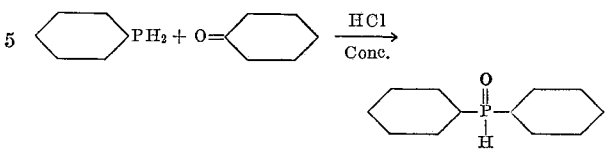

The steric substituent constants, $E_s$, at 25° C. are fully defined in the literature in various places. Typically, the text, "Steric Effects in Organic Chemistry," edited by Melvin S. Newman and published by John Wiley & Son, Inc., New York, N.Y. (1956), discloses on page 598 thereof the meaning of various steric substituent constants for organic substituents.

The reactants of the present invention may be brought together in almost any sequence. While stoichiometric amounts of these reactants react to form the products of the present invention, it is not critical or necessary to have only stoichiometric amounts present. Any surplus of any reactant with respect to the other may be present without affecting the nature of the reaction. Obviously, too large a surplus is both cumbersome and impractical.

While reaction is generally carried out at room temperature (20° C.–25° C.), temperatures in the range of 0° C.–150° C. may be employed. In addition, atmospheric, sub-atmospheric or super-atmospheric pressures may be employed without changing the nature of the reaction.

Pursuant to the instant discovery a wide variety of symmetrical and unsymmetrical secondary phosphine oxides may be produced. The process is unprecedented and very attractive in view of the fact that it is a one-step method for producing compounds which are valuable.

Typical primary phosphines within the purview of the instant invention are phenylphosphine, cyclohexylphosphine, para - chlorophenylphosphine, isobutylphosphine, tertiary-butylphosphine, benzylphosphine, octylphosphine, cyanoethylphosphine, 2-methoxyethylphosphine, para-bromophenylphosphine, dodecylphosphine, hexadecylphosphine, octadecylphosphine, isopropylphosphine, and the like. As is evident from this representative list of primary phosphine reactants, lower alkoxy-substituted and cyano-substituted alkyl phosphines are contemplated herein as reactants, as well as para-halosubstituted phenyl phosphines.

Typical carbonyl compounds are cyclohexanone, 4-lower alkyl-substituted cyclohexanone, acetophenone, hexylmethyl ketone, diphenyl ketone, diethyl ketone, dibutyl ketone, ethylmethyl ketone, dipropyl ketone, octylbutyl ketone, diheptyl ketone, hexylpentyl ketone, and the like.

The present invention will best be understood from the following representative examples which are intended to illustrate and not limit the scope of the invention:

*Example I.—Dicyclohexylphosphine oxide*

Into a flask purged with nitrogen is placed one part of cyclohexanone dissolved in fifty parts of concentrated hydrochloric acid. One part of cyclohexylphosphine is added thereto and the resulting solution refluxed for two hours. A two layer mixture forms which is diluted with water and extracted with chloroform. Upon evaporating the chloroform from the extracted material a solid residue results. This product residue is then recrystallized from normal hexane and is identified as dicyclohexylphosphine oxide.

Example II

Example I is repeated in every essential respect with the exception that phenylphosphine is substituted for cyclohexylphosphine and acetophenone is substituted for cyclohexanone. The corresponding secondary phosphone oxide, (α-methylbenzyl)phenylphosphine oxide, is recovered as taught in Example I, above.

Examples III–X

In the following table Example I, above, is repeated in every essential respect with the exception that the reaction conditions are modified within the scope of conditions taught herein and, of course, the corresponding products are produced:

in the presence of a concentrated mineral acid and producing a secondary phosphine oxide of the formula $$R-\underset{\underset{H}{|}}{\overset{\overset{O}{\|}}{P}}-\underset{\underset{H}{|}}{C}\overset{R'}{\underset{R''}{\diagdown}}$$

R in the above formulae representing a member of the group consisting of substituted and unsubstituted alkyl having from 1 to 18 carbon atoms, aryl, aralkyl, para-halosubstituted phenyl and cycloalkyl, said substituents for alkyl being selected from the group consisting of cyano and lower alkoxy; R' representing a member selected from the group consisting of alkyl having from 1 to 8 carbon atoms, and phenyl; R'' represents a member

TABLE I

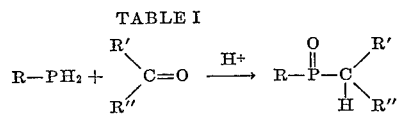

| Example No. | Primary Phosphine (A) | Carbonyl Compound (B) | Conc. Acid | Molar Ratio A:B | Temp., °C. | Secondary Phosphine Oxide (C) |
|---|---|---|---|---|---|---|
| III | Phenylphosphine | Dibutyl ketone | HCl | 3:1 | 30 | (1-Butylpentyl)phenylphosphine oxide. |
| IV | Cyclohexylphosphine | Ethylmethyl ketone | H₂SO₄ | 1:2 | 20 | (1-methylpropyl)cyclohexylphosphine oxide. |
| V | Para-chlorophenylphosphine | Acetophenone | HCl | 4:1 | 90 | (α-Methylbenzyl)-p-chlorophenylphosphine oxide. |
| VI | Isobutylphosphine | Diethyl ketone | H₃PO₄ | 1:3 | 70 | (1-Ethylpropyl)isobutylphosphine oxide. |
| VII | Tert-butylphosphine | Ethylphenyl ketone | H₂SO₄ | 7:1 | 10 | (α-Ethylbenzyl)tert-butylphosphine oxide. |
| VIII | Octylphosphine | Diethyl ketone | HCl | 1:8 | 85 | (1-Ethylpropyl)octylphosphine oxide. |
| IX | Benzylphosphine | Ethylpropyl ketone | H₂SO₄ | 1:1 | 110 | (1-Ethylbutyl)benzylphosphine oxide. |
| X | Dodecylphosphine | Dipropyl ketone | HCl | 1:1 | 60 | (1-Propylbutyl)dodecylphosphine oxide. |
| XI | Hexadecylphosphine | Hexylmethyl ketone | HBr | 1:2 | 150 | (1-Methylheptyl)hexadecylphosphine oxide. |
| XII | Octadecylphosphine | Benzophenone | HCl | 1:2 | 30 | (α-Phenylbenzyl)-octadecylphosphine oxide. |
| XIII | Isopropylphosphine | Acetophenone | H₂SO₄ | 1:1 | 25 | (α-Methylbenzyl)isopropylphosphine oxide. |
| XIV | Cyclohexylphosphine | 4-methylcyclohexanone | HBr | 1:2 | 0 | (p-Methylcyclohexyl)cyclohexylphosphine |
| XV | 2-methoxyethylphosphine | Butylethyl ketone | HCl | 1:3 | 15 | (1-Ethylpentyl)-2-methoxyethylphosphine oxide. |
| XVI | Cyanoethylphosphine | Benzophenone | HCl | 1:1 | 80 | (α-Phenylbenzyl)cyanoethylphosphine oxide. |

The compounds of the present invention are particularly useful as sequestering agents in the selective removal of heavy metal values from mixtures containing ions, such as uranyl. Uranyl values can be selectively leached from an ore containing the same by employing techniques known in the art, as shown by Blake et al. in the Atomic Energy Commission Report ORNL–1903, May 13, 1955.

By concentrated mineral acid herein is intended a strong mineral acid having at least 8 molar concentration of the acid in aqueous solution. While no lower than about 8 molar acid concentration is contemplated herein, there should be at least a minimum of 10% water in the aqueous acid solution.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:
1. A method which comprises bringing together into intimate contact a primary phosphine of the formula RPH₂ and a carbonyl compound of the formula

selected from the group consisting of alkyl having from 2 to 8 carbon atoms and phenyl, and R' and R'' taken together with

represent cyclohexyl; and the sum of the steric substituent constants, E_s, of the moieties R— and

being below about −1.50 at 25° C.

2. The process of claim 1 wherein the primary phosphine reactant is cyclohexylphosphine and the carbonyl compound is cyclohexanone and the product is dicyclohexylphosphine oxide.

3. The process of claim 1 wherein the primary phosphine reactant is phenylphosphine and the carbonyl reactant is acetophenone and the product is (α-methylbenzyl)phenylphosphine oxide.

4. A secondary phosphine oxide of the formula

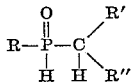

wherein R in the above formula represents a member of the group consisting of substituted and unsubstituted alkyl having from 1 to 18 carbon atoms, aryl, aralyl, para-halosubstituted phenyl and cycloalkyl, said substituents for alkyl being selected from the group consisting of cyano and lower alkoxy; R' represents a member selected from the group consisting of alkyl having from 1 to 8 carbon atoms, and phenyl; R" represents a member selected from the group consisting of alkyl having from 2 to 8 carbon atoms and phenyl and the sum of the steric substituent constants, $E_s$, of the moieties R— and

being below about —1.50 at 25° C.

5. (α-methylbenzyl)phenylphosphine oxide.

References Cited by the Examiner

UNITED STATES PATENTS 2,957,931  10/1960  Hamilton et al. ___ 260—606.5 X

FOREIGN PATENTS

Berlin et al., Chem. Reviews, vol. 60. p. 258 (1960).
Buckler et al., Journal of the American Chemical Society, vol. 82, 1960, pp. 2076 and 2077.

TOBIAS E. LEVOW, *Primary Examiner.*

LEON D. ROSDOL, *Examiner.*

L. A. SEBASTIAN, F. R. OWENS, *Assistant Examiners.*